US012612058B2

(12) United States Patent
Diamond et al.

(10) Patent No.: US 12,612,058 B2
(45) Date of Patent: Apr. 28, 2026

(54) SYSTEMS AND METHODS FOR IDENTIFYING A MALFUNCTIONING VEHICLE BUTTON AND PERFORMING REMEDIAL ACTIONS

(71) Applicant: Ford Global Technologies, LLC, Dearborn, MI (US)

(72) Inventors: Brendan Diamond, Grosse Pointe, MI (US); Keith Weston, Canton, MI (US); John Robert Van Wiemeersch, Novi, MI (US); Stuart C. Salter, White Lake, MI (US)

(*) Notice: Subject to any disclaimer, the term of this patent is extended or adjusted under 35 U.S.C. 154(b) by 213 days.

(21) Appl. No.: 18/434,476

(22) Filed: Feb. 6, 2024

(65) Prior Publication Data

US 2025/0249915 A1 Aug. 7, 2025

(51) Int. Cl.
| | |
|---|---|
| *B60W 50/029* | (2012.01) |
| *B60W 40/08* | (2012.01) |
| *B60W 50/02* | (2012.01) |
| *B60W 50/14* | (2020.01) |
| *G06V 40/16* | (2022.01) |

(52) U.S. Cl.
CPC .......... *B60W 50/029* (2013.01); *B60W 40/08* (2013.01); *B60W 50/0205* (2013.01); *B60W 50/14* (2013.01); *G06V 40/174* (2022.01); *B60W 2050/021* (2013.01); *B60W 2050/0295* (2013.01); *B60W 2420/403* (2013.01); *B60W 2556/10* (2020.02)

(58) Field of Classification Search
CPC .............. B60W 50/029; B60W 40/08; B60W 50/0205; B60W 50/14; B60W 2050/021; B60W 2050/0295; B60W 2420/403; B60W 2556/10; G06V 40/174

USPC .......................................................... 701/29.2
See application file for complete search history.

(56) References Cited

U.S. PATENT DOCUMENTS

| | | | | | |
|---|---|---|---|---|---|
| 11,506,715 | B2* | 11/2022 | Song | ....................... | G01R 19/10 |
| 2009/0020343 | A1* | 1/2009 | Rothkopf | ............. | H03K 17/955 |
| | | | | | 178/18.05 |

(Continued)

FOREIGN PATENT DOCUMENTS

| | | | |
|---|---|---|---|
| JP | 2009256018 | A | 11/2009 |
| JP | 2011079350 | A * | 4/2011 |
| KR | 101337855 | B1 | 12/2013 |

OTHER PUBLICATIONS

Dubizzle, Fault Detection Technology in Cars, https://www.dubizzle.com/blog/cars/fault-detection-technology-cars/, 2023, pp. 1-6.

*Primary Examiner* — Isaac G Smith
(74) *Attorney, Agent, or Firm* — Frank Lollo; Eversheds Sutherland (US) LLP

(57) ABSTRACT

A vehicle including a detection unit and a processor unit is disclosed. The detection unit may be configured to monitor a current button usage associated with a button of the vehicle. The processor unit may be configured to obtain the current button usage, and compare the current button usage with an expected button usage behavior associated with the button. The processor may be further configured to determine that the button may be malfunctioning when a difference between the current button usage and the expected button usage behavior exceeds a predefined threshold, and perform a remedial action responsive to determining that the button may be malfunctioning.

20 Claims, 5 Drawing Sheets

(56)  References Cited

U.S. PATENT DOCUMENTS

| | | | | |
|---|---|---|---|---|
| 2015/0020026 A1* | 1/2015 | Miyamoto | ............ | G06F 3/0482 |
| | | | | 715/809 |
| 2017/0210392 A1* | 7/2017 | Shah | ..................... | B60W 50/14 |
| 2017/0305349 A1* | 10/2017 | Naboulsi | ................. | B60R 1/025 |
| 2018/0114383 A1 | 4/2018 | Boss et al. | | |
| 2019/0005394 A1 | 1/2019 | Sadasivam et al. | | |
| 2020/0257284 A1* | 8/2020 | Hassani | ................ | B60W 50/10 |
| 2020/0302708 A1 | 9/2020 | Thompson | | |
| 2020/0334762 A1* | 10/2020 | Carver | ................. | G07C 5/0825 |
| 2022/0050547 A1* | 2/2022 | Silverstein | .......... | G06F 11/2028 |
| 2022/0189072 A1* | 6/2022 | Velleu | .................. | H04N 9/3194 |

* cited by examiner

Clean the button and perform intermittent cleaning

SYSTEMS AND METHODS FOR IDENTIFYING A MALFUNCTIONING VEHICLE BUTTON AND PERFORMING REMEDIAL ACTIONS

FIELD

The present disclosure relates to vehicles, and more particularly to systems and methods for identifying a malfunctioning vehicle button and performing remedial actions.

BACKGROUND

In general, vehicle buttons may malfunction due to vehicle aging or wear and tear, and/or improper handling of the vehicle buttons by the vehicle users. For example, there are known instances of vehicle buttons getting stuck in the "depressed position" or that stop working overtime or with frequent use. In some scenarios, the malfunctioning may cause inconvenience to the vehicle users, as the button may not be able to perform its associated function.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
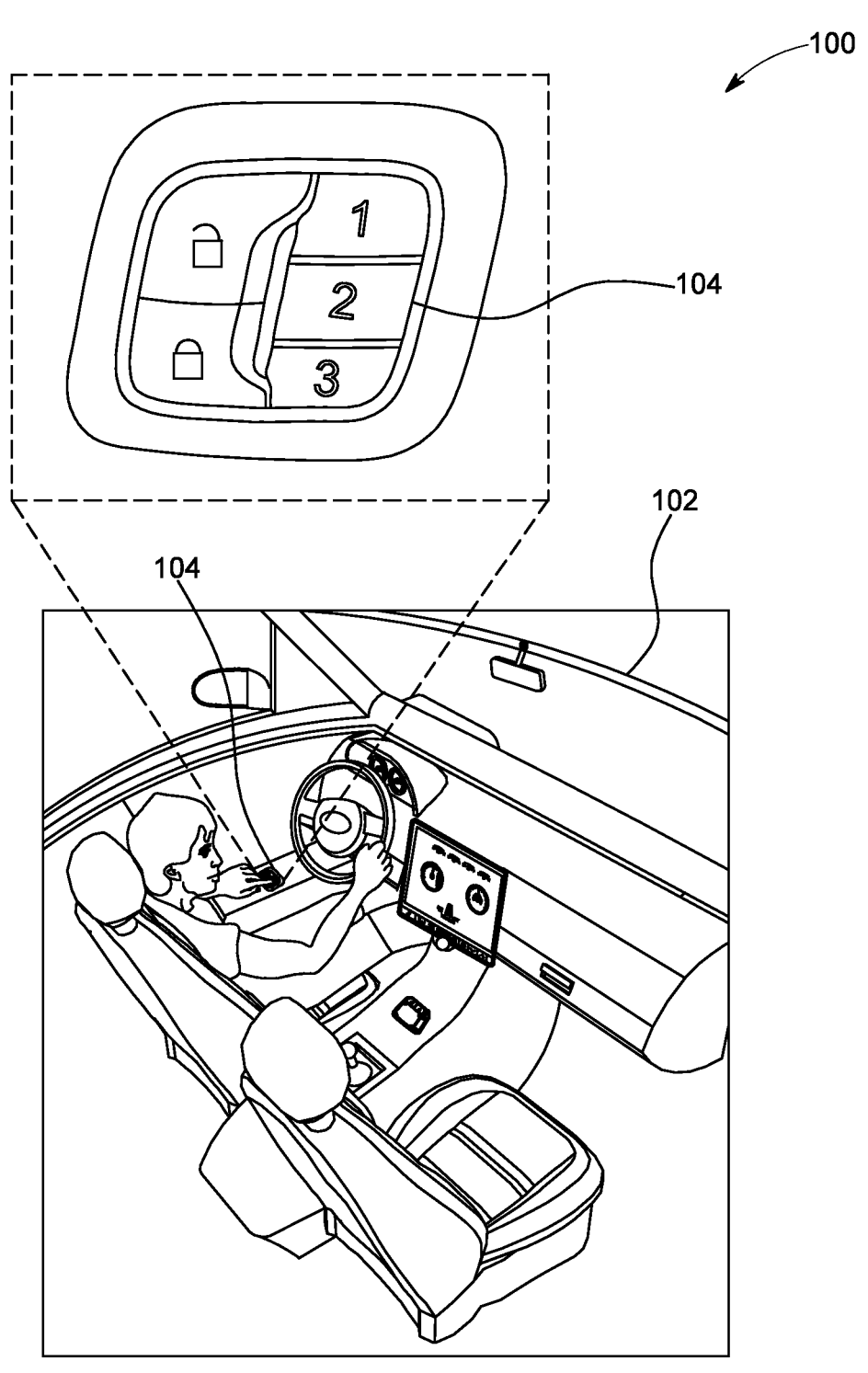
FIG. 1 depicts an example environment in which techniques and structures for providing the systems and methods disclosed herein may be implemented.

The present disclosure describes a system and method to automatically determine if a button in a vehicle is malfunctioning, and perform remedial action(s) responsive to a determination that the button may be malfunctioning. Such buttons may be located anywhere in the vehicle interior portion including, but not limited to, vehicle doors, a vehicle front portion such as the dashboard, or any other location. In further aspects, the buttons may be disposed on a key fob associated with the vehicle or an exterior switch (e.g., keypad, passive lock, passive unlock, trunk/frunk release, gate release, etc.).

In some aspects, the system may monitor a current button usage associated with a button in the vehicle. For example, the system may monitor a current button hold time associated with the button, a count of times the button may be pressed in a predefined time duration, etc. The system may then compare the current button usage with an expected button usage behavior. In some aspects, the system may determine/derive the expected button usage behavior based on historical button usage information that may be stored in a system memory. Based on the comparison between the current button usage and the expected button usage behavior, the system may determine if the button may be malfunctioning. In an exemplary aspect, the system may determine a difference between the current button usage and the expected button usage behavior, and may determine that the button may be malfunctioning when the difference may be greater than a predefined threshold.

Responsive to determining that the button may be malfunctioning, the system may perform one or more remedial actions including, but not limited to, deactivating/disabling the button, assigning a functionality associated with the button to another vehicle component (such as a vehicle Human-Machine Interface (HMI)) or another button in the vehicle, etc. In additional aspects, the system may output a notification to the vehicle user (via the vehicle HMI or a user device associated with the vehicle user), requesting the vehicle user to clean the button, get the button repaired, use the vehicle HMI (or the other button) to perform the associated function, and/or the like.

In further aspects, the system may determine a malfunction type based on the comparison of the current button usage with the expected button usage behavior, and may perform the remedial action based on the malfunction type. The malfunction type may be, e.g., a stuck button, a non-operational button, or an intermittently working button.

In additional aspects, the system may determine a root cause for the button malfunctioning, and may output a notification to the vehicle user indicating the root cause. In addition, the system may perform the remedial action based on the root cause. For example, the system may determine that the root cause for sticking of the button may be due to extremely cold or hot vehicle temperature. In such cases, the system may output a notification to the vehicle user requesting the vehicle user to modify the vehicle temperature.

The present disclosure discloses a system and method to identify a malfunctioning button, and assist a vehicle user to conveniently perform the function associated with the malfunctioning button by using other vehicle components. The system may further recommend ways to fix the malfunctioned button (such as by cleaning the button), and may also provide information associated with the cause of the malfunctioning, so that the vehicle user may use the button in the future without any inconvenience.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 102. The vehicle 102 may take the form of any passenger or commercial vehicle such as, for example, a car, a work vehicle, a crossover vehicle, a van, a minivan, a truck, a taxi, a bus, etc. Further, the vehicle 102 may be a manually driven vehicle and/or be configured to operate in a fully autonomous (e.g., driverless)

mode and/or partially autonomous mode. In some aspects, the vehicle 102 may include a traction battery or battery pack ("vehicle battery", not shown) that may provide energy for vehicle propulsion. In other aspects, the vehicle 102 may include any other powertrain such as a gasoline engine.

In some aspects, the vehicle 102 may include a plurality of buttons 104 that may be configured to perform different functions or enable operation of different vehicle components/features. For example, the buttons 104 (including knobs and capacitive buttons) may be used to lock/unlock the vehicle 102 (e.g., lock/unlock vehicle doors) from a vehicle interior portion, open/close vehicle windows, control stereo/infotainment system operation such as changing volume/channels, control air conditioning such as setting vehicle temperature/fan speed, control lights/indicators such as parking indicators, etc. Such buttons may be located anywhere in the vehicle interior portion including, but not limited to, vehicle doors, a vehicle front portion such as a dashboard, or any other location. In further aspects, the buttons may be located at vehicle exterior portion such as keypad, passive lock, passive unlock, trunk/frunk release, gate release, etc. In further aspects, the buttons 104 may be disposed on a key fob (not shown) associated with the vehicle 102, and may be used for different purposes such as locking/unlocking the vehicle 102.

Figure 2:
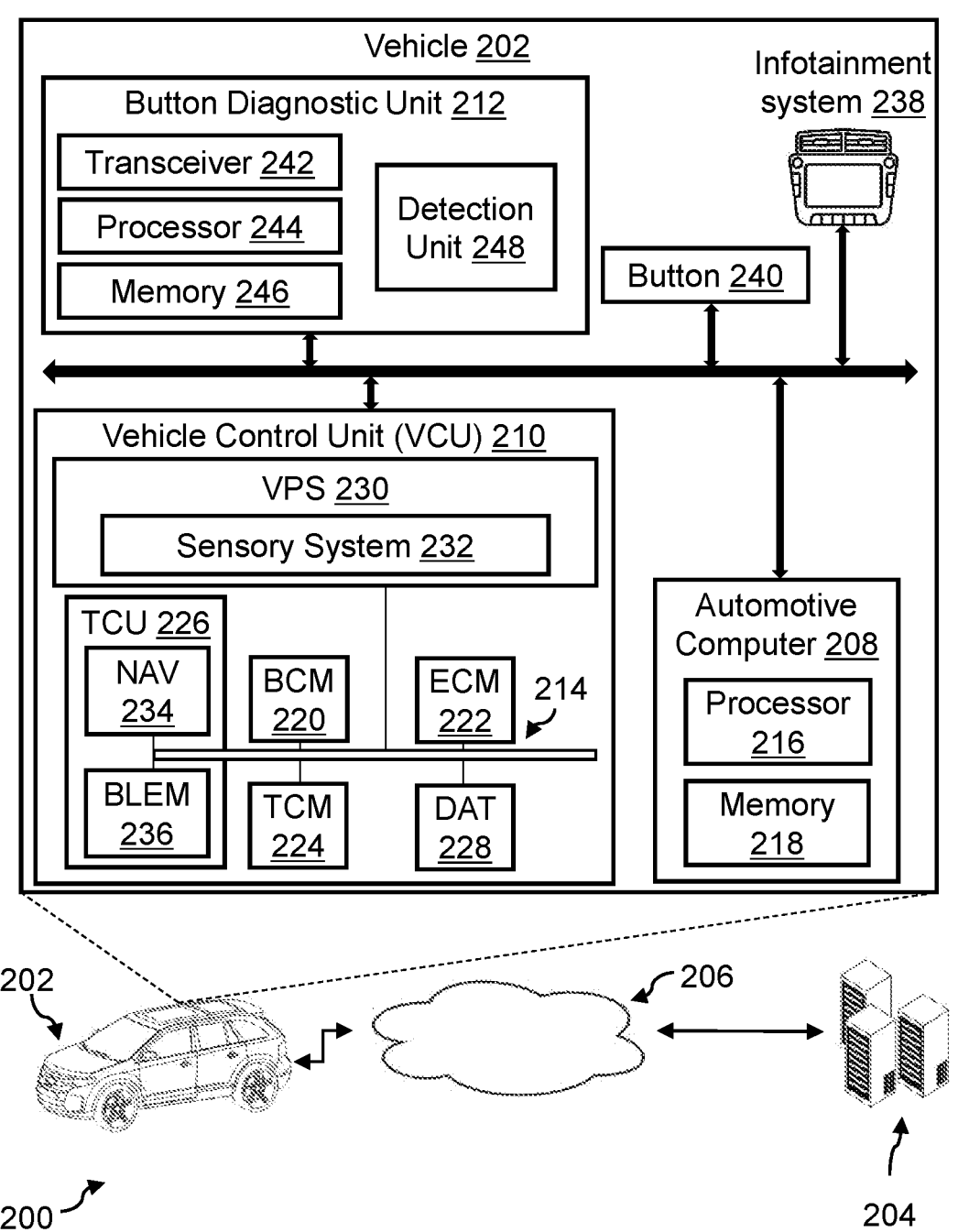
FIG. 2 depicts a block diagram of a system to detect a vehicle button malfunction and perform remedial action in accordance with the present disclosure.

In some aspects, the vehicle 102 may include a button diagnostic unit (shown as button diagnostic unit 212 in FIG. 2). The button diagnostic unit (or "unit") may be configured to detect when one or more buttons 114 may be malfunctioning. Stated another way, the unit may be configured to detect whether the button 104 may be performing its respective operation/function properly or not. For example, the unit may detect whether the button 104 may be functioning properly, or may be stuck in a position (e.g., stuck in a pressed position), not working, or working intermittently. The unit may be further configured to perform one or more remedial actions when the unit determines that the button may be malfunctioning (i.e., when the button 104 may be stuck, not working, working intermittently, or require more force/pressure than usual force/pressure (e.g., in case of capacitive buttons). The process of determining whether the button 104 may be malfunctioning or not is briefly described below, and described in detail later in the description below in conjunction with FIG. 2.

In some aspects, the unit may detect/monitor a "current button usage" associated with the button 104. For example, the unit may monitor how the vehicle user may be pressing the button 104, such as a hold time associated with the button 104, a frequency of using the button 104 in a predefined time duration (e.g., 10 seconds to 2 minutes), how hard the vehicle user may be pushing the button 104 or an amount of force that the vehicle user may be applying to the button 104, and/or the like. Responsive to detecting the current button usage, the unit may compare the current button usage with an expected button usage behavior associated with the button 104, and determine that the button 104 may be malfunctioning based on the comparison. Specifically, the unit may determine that the button 104 may be malfunctioning when a difference between the current button usage and the expected button usage behavior may be greater than a predefined threshold. For example, the unit may determine that the 104 may be malfunctioning when the vehicle user may be required to hold the button 104 for 5 seconds (as determined via the current button usage) to make the button 104 perform its expected function, and the expected hold time may be less than 1 second (as determined via the expected button usage behavior). In this exemplary case, the predefined threshold may be 0.5 or 1 second, and since the difference between the current button usage and the expected button usage behavior is more than the predefined threshold, the unit may determine that the button 104 may be malfunctioning. Similarly, in case of capacitive buttons, the unit may determine that the button 104 may be malfunctioning when the vehicle user may be applying more force than expected, or pressing the button back and forth, up and down, or in circular motion in less than a predefined time interval.

In some aspects, the expected button usage behavior may include an expected usage pattern associated with the button 104 including, but not limited to, an expected hold time for the button 104, an expected frequency to use the button 104 in a predefined time duration, an expected force required to operate the button 104, and/or the like. In some aspects, the expected button usage behavior may be based on information associated with historical usage pattern of the button 104 (that may be stored in the vehicle memory). For example, the unit may determine from the historical usage pattern that the vehicle user generally/historically holds the button 104 for one second to make the button 104 perform its associated function. In this case, the unit may assign one second as the expected button usage behavior or expected hold time for the button 104. In scenarios where the vehicle user holds the button 104 for longer than the one second (e.g., for two or more seconds), the unit may determine that the button 104 may be malfunctioning (e.g., stuck in a pressed position).

In further aspects, the unit may monitor and use additional information to determine that the button 104 may be malfunctioning. For example, the unit may monitor environmental conditions such as temperature/humidity in the vehicle interior portion, vehicle movement patterns such as vehicle movement near beaches, eating/drinking behavior of the vehicle user in the vehicle interior portion, use of gloves/lotion/oil inside the vehicle 102, and/or the like, and use such information to determine whether the button 104 may be malfunctioning. As an example, if the vehicle 102 frequently travels in proximity to beaches, or the vehicle user frequently eats in the vehicle interior portion, the unit may predict that debris/dust may be accumulated in proximity to the button 104, and the button 104 may hence be malfunctioning.

Responsive to a determination that the button 104 may be malfunctioning, the unit may perform one or more remedial action(s). In some aspects, the remedial actions performed by the unit may include, but are not limited to, deactivating/disabling the button 104, assigning a functionality associated with the button 104 to another vehicle component (such as a vehicle Human-Machine Interface (HMI) touch screen display or speech recognition engine) or another button in the vehicle 102, etc. In additional aspects, the unit may perform the remedial action by outputting a notification to the vehicle user (via the vehicle HMI or a user device associated with the vehicle user), requesting the vehicle user to clean the button 104 (e.g., wipe the capacitive button with cloth), get the button 104 repaired, use the vehicle HMI (or the other button) to perform the associated function, and/or the like.

In further aspects, the unit may identify a cause/reason for the button malfunction, and may perform the remedial action based on the identified cause. For example, when the unit identifies that the cause for the button malfunction may be frequent eating/drinking in the vehicle interior portion or frequent travel to the beaches (via the vehicle 102), the unit may output a notification to clean the button 104 (as dust/ debris may be accumulated at the button 104). In additional aspects, the unit may take feedback from the vehicle user to confirm if the remedial action is helpful for the vehicle user, to learn and enhance future recommendations/notifications.

Further vehicle/unit details are described below in conjunction with FIG. 2.

The vehicle 102 implements and/or performs operations, as described here in the present disclosure, in accordance with the owner manual and safety guidelines. In addition, any action taken by the vehicle user based on the notifications provided by the vehicle 102 should comply with all the rules specific to the location and operation of the vehicle 102 (e.g., Federal, state, country, city, etc.). The notifications, as provided by the vehicle 102, should be treated as suggestions and only followed according to any rules specific to the location and operation of the vehicle 102.

FIG. 2 depicts a block diagram of a system 200 to detect a vehicle button malfunction and perform remedial action in accordance with the present disclosure. While describing FIG. 2, references will be made to FIGS. 3 and 4.

The system 200 may include a vehicle 202 (same as the vehicle 102) and one or more servers 204 (or server 204) communicatively coupled with each other via one or more networks 206 (or a network 206). The server 204 may be part of a cloud-based computing infrastructure and may be associated with and/or include a Telematics Service Delivery Network (SDN) that provides digital data services to the vehicle 202, and other vehicles (not shown) that may be part of a vehicle fleet. In further aspects, the server 204 may store information associated with historical button usage patterns for each button (e.g., a button 240, which may be same as the button 104, as described below) of the vehicle 202. As an example, the server 204 may store a historical hold time or press time associated with a button (e.g., a typical time duration the vehicle user presses or holds the button), how hard the vehicle user typically presses the button or an amount of force the vehicle user typically applies to the button, a frequency of usage associated with the button in a predefined time duration, a location, time, day, etc., at which the vehicle user typically uses the button, usage by different users, and/or the like. The server 204 may transmit the information associated with the historical button usage pattern to the vehicle 202 at a predefined frequency, or when the vehicle 202 transmits a request to the server 204 to obtain such information. In further aspects, the server 204 may be configured to receive information associated with malfunctioning of the button. The information may include button identifier associated with the button, supporting data (e.g., time, temperature, occurrence rate, additionally (with user concurrence/approval) location and user identification), and/ or the like. The server 204 may use such information to establish an aggregate database for the same vehicle model or similar vehicles to help enhance vehicle quality and aid vehicle dealers or vehicle repair firms in efficiently gauging vehicle button performance and planning repair methods.

The network 206 illustrates an example communication infrastructure in which the connected devices discussed in various embodiments of this disclosure may communicate. The network 206 may be and/or include the Internet, a private network, public network or other configuration that operates using any one or more known communication protocols such as, for example, transmission control protocol/Internet protocol (TCP/IP), Bluetooth®, BLE, Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High- Speed Packet Access (HSPDA), Long-Term Evolution (LTE), Global System for Mobile Communications (GSM), and Fifth Generation (5G), to name a few examples.

The vehicle 202 may include a plurality of units including, but not limited to, an automotive computer 208, a Vehicle Control Unit (VCU) 210, and a button diagnostic unit 212 (or unit 212). The VCU 210 may include a plurality of Electronic Control Units (ECUs) 214 disposed in communication with the automotive computer 208.

The automotive computer 208 and/or the unit 212 may be installed anywhere in the vehicle 202, in accordance with the disclosure. Further, the automotive computer 208 may operate as a functional part of the unit 212. The automotive computer 208 may be or include an electronic vehicle controller, having one or more processor(s) 216 and a memory 218. Moreover, the unit 212 may be separate from the automotive computer 208 (as shown in FIG. 2) or may be integrated as part of the automotive computer 208.

The processor(s) 216 may be disposed in communication with one or more memory devices disposed in communication with the respective computing systems (e.g., the memory 218 and/or one or more external databases not shown in FIG. 2). The processor(s) 216 may utilize the memory 218 to store programs in code and/or to store data for performing aspects in accordance with the disclosure. The memory 218 may be a non-transitory computer-readable storage medium or memory storing a button diagnostic program code. The memory 218 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 210 may share a power bus with the automotive computer 208 and may be configured and/or programmed to coordinate the data between vehicle systems, connected servers (e.g., the server 204), and other vehicles operating as part of a vehicle fleet. The VCU 210 may include or communicate with any combination of the ECUs 214, such as, for example, a Body Control Module (BCM) 220, an Engine Control Module (ECM) 222, a Transmission Control Module (TCM) 224, a telematics control unit (TCU) 226, a Driver Assistances Technologies (DAT) controller 228, etc. The VCU 210 may further include and/or communicate with a Vehicle Perception System (VPS) 230, having connectivity with and/or control of one or more vehicle sensory system(s) 232. The vehicle sensory system 232 may include one or more vehicle sensors including, but not limited to, a Radio Detection and Ranging (RADAR or "radar") sensor configured for detection and localization of objects inside and outside the vehicle 102 using radio waves, sitting area buckle sensors, sitting area sensors, a Light Detecting and Ranging ("lidar") sensor, door sensors, proximity sensors, temperature sensors, wheel sensors, one or more ambient weather or temperature sensors, vehicle interior and exterior cameras, steering wheel sensors, a vehicle gyroscope, a vehicle magnetometer, ultrasonic sensors, etc. In some aspects, the vehicle sensory system 232 may be configured to capture user inputs or user expressions. For example, the vehicle interior/exterior camera may be configured to capture user facial expressions (e.g., whether the vehicle user is frustrated, agitated or calm) and/or user inputs (e.g., whether the vehicle user is trying to control a volume of the stereo in the vehicle 202 using a button), etc. The vehicle sensory system 232 may be further configured to transmit such "sensor inputs" to the unit 212 at a predefined frequency.

In some aspects, the VCU 210 may control vehicle operational aspects and implement one or more instruction sets received from the server 204, from one or more instruction sets stored in the memory 218, including instructions operational as part of the unit 212.

The TCU 226 may be configured and/or programmed to provide vehicle connectivity to wireless computing systems onboard and off board the vehicle 102, and may include a Navigation (NAV) receiver 234 for receiving and processing a GPS signal, a BLE® Module (BLEM) 236 or BUN (BLE, UWB, NFC module), a Wi-Fi transceiver, an ultra-wideband (UWB) transceiver, and/or other wireless transceivers (not shown in FIG. 2) that may be configurable for wireless communication (including cellular communication) between the vehicle 202 and other systems (e.g., the server 204), computers, and modules. The TCU 226 may be disposed in communication with the ECUs 214 by way of a bus.

The ECUs 214 may control aspects of vehicle operation and communication using inputs from human drivers, inputs from the automotive computer 208, the unit 212, and/or via wireless signal inputs/command signals received via the wireless connection(s) from other connected devices, such as the server 204, a user device associated with the vehicle user, among others.

The BCM 220 generally includes integration of sensors, vehicle performance indicators, and variable reactors associated with vehicle systems, and may include processor-based power distribution circuitry that may control functions associated with the vehicle body such as lights, windows, security, camera(s), audio system(s), speakers, wipers, door locks and access control, various comfort controls, vehicle features, vehicle buttons (e.g., the button 240), etc. The BCM 220 may also operate as a gateway for bus and network interfaces to interact with remote ECUs (not shown in FIG. 2).

The DAT controller 228 may provide Level-1 through Level-3 automated driving and driver assistance functionality that may include, for example, active parking assistance, vehicle backup assistance, and/or adaptive cruise control, among other features. The DAT controller 228 may also provide aspects of user and environmental inputs usable for user authentication.

In some aspects, the automotive computer 208 may connect with an infotainment system 238 (or a vehicle Human-Machine Interface (HMI)). The infotainment system 238 may include a touchscreen interface portion, and may include speech and/or voice recognition features, biometric identification capabilities that may identify users based on facial recognition, speech and/or voice recognition, fingerprint identification, or other biological identification means. In other aspects, the infotainment system 238 may be further configured to receive user instructions via the touchscreen interface portion, and/or output or display notifications, navigation maps, etc. on the touchscreen interface portion. In additional aspects, the infotainment system 238 may be configured to enable the vehicle user to control a functionality associated with the button 240. The button 240 may be same as the button 104, described above in conjunction with FIG. 1.

The computing system architecture of the automotive computer 208, the VCU 210, and/or the unit 212 may omit certain computing modules. It should be readily understood that the computing environment depicted in FIG. 2 is an example of a possible implementation according to the present disclosure, and thus, it should not be considered as limiting or exclusive.

In accordance with some aspects, the unit 212 may be integrated with and/or executed as part of the ECUs 214. The unit 212, regardless of whether it is integrated with the automotive computer 208 or the ECUs 214, or whether it operates as an independent computing system in the vehicle 202, may include a transceiver 242, a processor 244, a computer-readable memory 246, and a detection unit 248, which may be communicatively coupled to each other.

The transceiver 242 may be configured to receive information/inputs from one or more external devices or systems, e.g., the server 204, a user device associated with the vehicle user, and/or the like, via the network 206. Further, the transceiver 242 may transmit notifications, requests, signals, etc. to the external devices or systems or vehicles. In addition, the transceiver 242 may be configured to receive information/inputs from vehicle components such as the VCU 210, the infotainment system 238, etc. Further, the transceiver 242 may transmit signals (e.g., command signals) or notifications to the vehicle components such as the BCM 220, the infotainment system 238, and/or the like.

The detection unit 248 may be configured to monitor the current button usage associated with the button 240. The current button usage may include, for example, a hold time associated with the button 240, a frequency of button usage in a predefined time duration, an amount of force that the vehicle user may be applying to the button 104, and/or the like. In some aspects, each button in the vehicle 202 may be mapped to a pin or circuit in the vehicle 202, which may be used to detect the pressing activity associated with the respective button (e.g., the button 240). The detection unit 248 may monitor the current button usage associated with each vehicle button based on inputs obtained from the respective pins/circuit.

In further aspects, the detection unit 248 may be configured to monitor environmental conditions associated with the button 240 including, but not limited to, temperature, humidity, etc. in the vehicle interior portion. In further aspects, the detection unit 248 may be configured to monitor vehicle usage behavior. The vehicle usage behavior may include, for example, eating/drinking habits inside the vehicle 202, vehicle movement pattern to specific locations (e.g., frequent travel to beaches via the vehicle 202), use of gloves inside the vehicle 202, and/or the like. In further aspects, the detection unit 248 may be configured to monitor vehicle user's facial expressions or user inputs, when the vehicle user may be located in the vehicle interior portion. In some aspects, the detection unit 248 may obtain inputs from one or more sensors included in the vehicle sensory system 232 (e.g., the vehicle cameras) and may monitor the user's facial expressions based on the inputs. The detection unit 248 may be a separate unit in the vehicle 202 (as shown in FIG. 2), or may be part of the vehicle sensory system 232.

The processor 244 and the memory 246 may be same as or similar to the processor 216 and the memory 218, respectively. In some aspects, the processor 244 may utilize the memory 246 to store programs in code and/or to store data for performing aspects in accordance with the disclosure. The memory 246 may be a non-transitory computer-readable storage medium or memory storing the button diagnostic program code. In some aspects, the memory may store the information associated with the historical usage pattern of the button 240 (and other vehicle buttons), which the vehicle 202 may be obtained from the server 204, via the transceiver 242.

In operation, the processor 244 may obtain the current button usage (e.g., the current hold time, the current frequency of usage, the current amount of force the vehicle user may be applying to the button, etc.) associated with the button 240 from the detection unit 248 (e.g., when the vehicle user may be pressing the button 240). Responsive to obtaining the current button usage, the processor 244 may obtain the information associated with the historical button usage pattern of the button 240 from the server 204 (or the memory 246). The processor 244 may then determine an expected button usage behavior associated with the button 240 based on the information associated with the historical button usage pattern. For example, the processor 244 may determine that the vehicle user generally/historically holds the button 104 for one second, and expects that the vehicle user will hold the button for one second in the future as well (in this case, the processor 244 may determine the "expected" hold time for the button 240 as one second).

The processor 244 may then compare the current button usage with the expected button usage behavior, and determine a difference between the current button usage and the expected button usage behavior. The processor 244 may determine that the button 240 may be malfunctioning when the difference may be greater than a predefined threshold. For example, if the predefined threshold for the hold time may be 20% of the expected button hold time (i.e., one second), and the current button usage indicates that the vehicle user may be holding the button 240 for more than 3 seconds, the processor 244 may determine that the button 240 may be malfunctioning. Responsive to determining that the button 240 may be malfunctioning, the processor 244 may perform one or more remedial actions, as described below. The examples of the remedial actions described below should not be construed as limiting. The processor 244 may perform additional remedial actions as well (which may not be described below), without departing from the present disclosure scope.

In some aspects, the processor 244 may disable/deactivate the functionality associated with the button 240, responsive to determining that the button 240 may be malfunctioning. In this case, the processor 244 may transmit a request or instructions to the pin/circuit associated with the button 240 to disable/deactivate the button 240. For example, if the button 240 is associated with fan speed control, the processor 244 may deactivate the button 240 to prevent any adverse situation, and may output a notification via the infotainment system 238 requesting the vehicle user to fix the button 240 before using it. In further aspects, instead of completely deactivating the button 240, the processor 244 may change an effect of the button press on a vehicle function. For example, if the button 240 is configured to control vehicle speed, the processor 244 may increase the maximum speed limit from one button press. In some aspects, the processor 244 may change the effect based on the intended functionality associated with the button 240.

Figure 3:
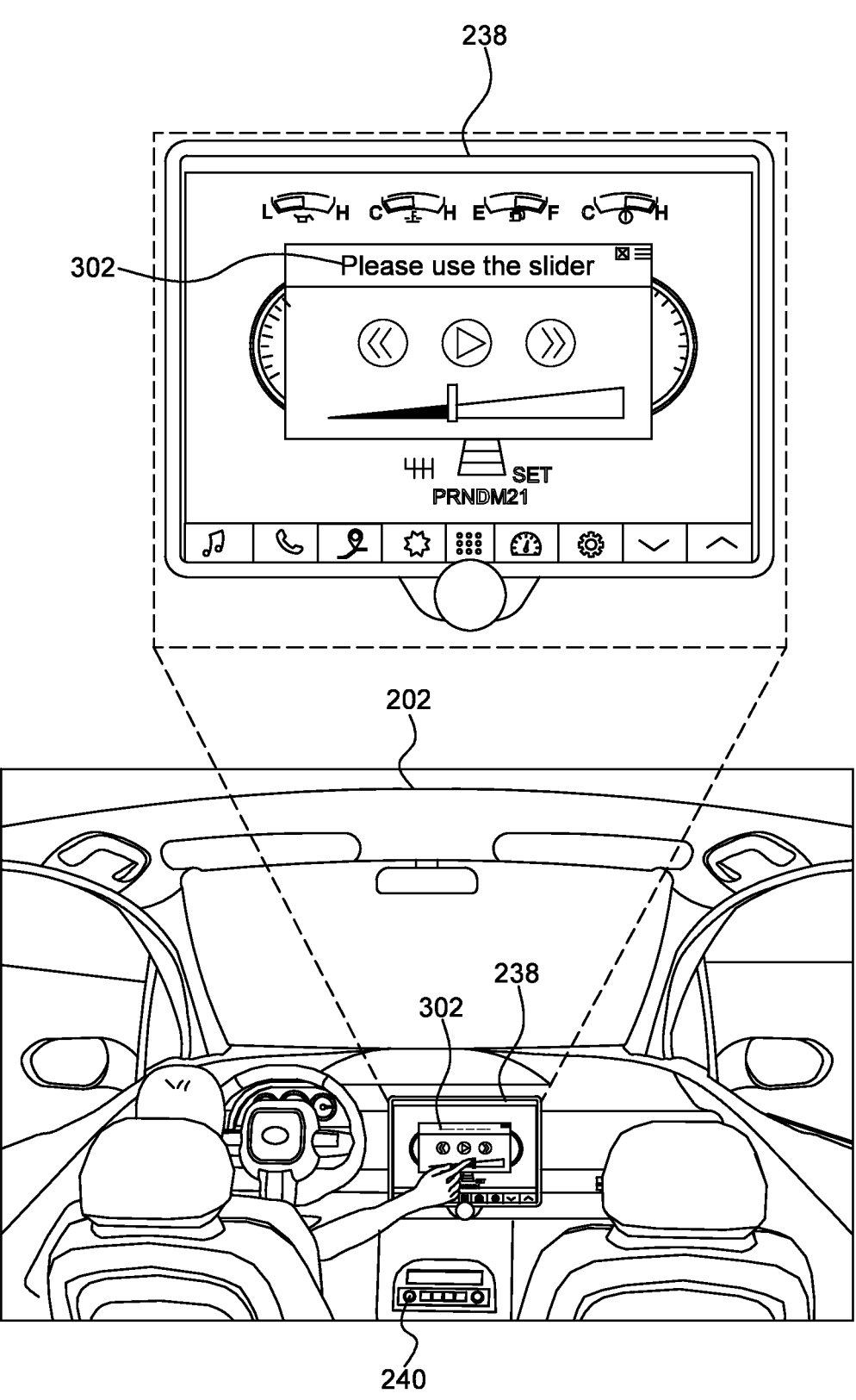
FIG. 3 depicts a snapshot of a first example remedial action in accordance with the present disclosure.

In further aspects, the processor 244 may temporarily assign another vehicle component the functionality associated with the button 240. For example, in some instances, the processor 244 may activate/enable the infotainment system 238 to perform the functionality associated with the button 240 (as shown in FIG. 3), when the processor 244 determines that the button 240 may be malfunctioning. As an example, if the button 240 may be configured to control stereo volume, the processor 244 may pop-up the infotainment system 238 with a slider option or cause the infotainment system 238 to display the slider option that may enable the vehicle user to control the stereo volume, when the button 240 may be malfunctioning. In further aspects, in this case, the processor 244 may output a notification 302 (as shown in FIG. 3), via the infotainment system 238 or the user device associated with the vehicle user, requesting the vehicle user to use the infotainment system 238 to control the stereo volume.

In another aspect, the processor 244 may assign another button (located inside the vehicle 202) the functionality associated with the button 240, when the button 240 may be malfunctioning. In this case also, the processor 244 may output a notification via the infotainment system 238, requesting the vehicle user to use the assigned button to perform the function associated with the button 240.

In some aspects, the processor 244 may perform additional actions to further assist the vehicle user in situations in which the button 240 may be malfunctioning, as described below.

In an exemplary aspect, the processor 244 may determine a malfunction type based on the comparison of the current button usage with the expected button usage behavior (or the determined difference between the current button usage and the expected button usage behavior). The malfunction type may be, e.g., a stuck button, a non-operational button, or an intermittently working button. Stated another way, based on the difference between the current button usage and the expected button usage behavior, the processor 244 may determine whether the button 240 may be stuck at a position, the button 240 may not be working, or the button 240 may be intermittently working. As an example, when the current button hold time may be considerably greater (e.g., more than 200 or 300%) than the expected button hold time, the processor 244 may determine that the button 240 may be stuck at a pressed position. In some aspects, to confirm that the button 240 may be stuck at a pressed position, the processor 244 may additionally determine a presence of a user finger on the button 240. Responsive to a determination that the user finger is not present on the button 240, the processor 244 may determine that the button 240 may be stuck in the pressed position (a type of malfunction). The processor 244 may then perform one or more remedial actions based on the determined malfunction type. Stated another way, the processor 244 may select an optimal remedial action to perform based on the malfunction type. For example, when the button 240 may be stuck, the processor 244 may output a notification to the vehicle user via the infotainment system 238 to get the button 240 repaired or clean the button 240.

In a similar manner, the processor 244 may determine that the button 240 may be working intermittently when the vehicle user may be required to press the button 240 more than once to actuate the desired function. In another example, the processor 244 may determine that the button 240 may be malfunctioning when the button 240 is pressed for a time-duration greater than a threshold value, while other buttons are incremental (e.g., moving in on/off position).

Figure 4:
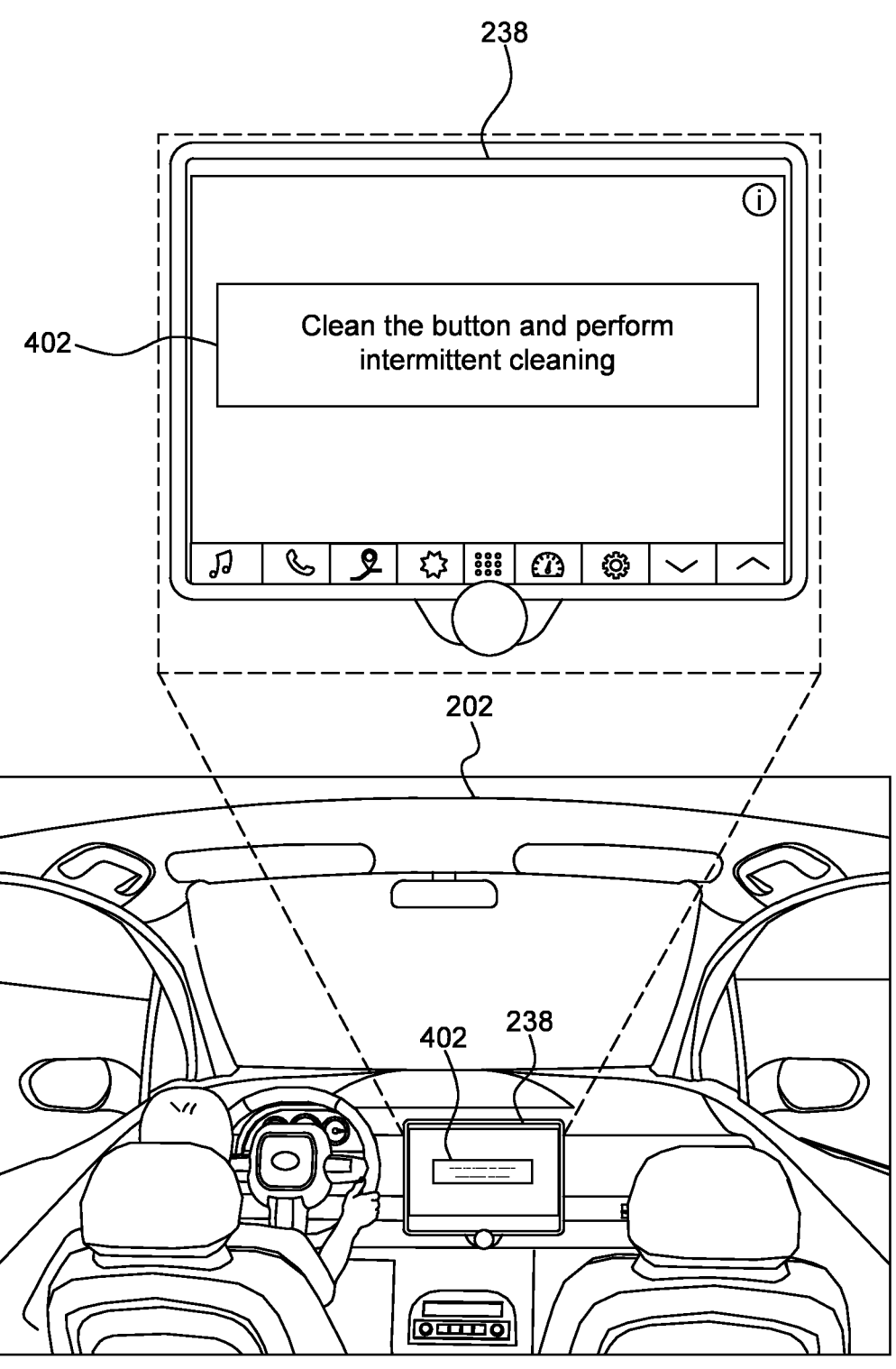
FIG. 4 depicts a snapshot of a second example remedial action in accordance with the present disclosure.

In further aspects, the processor 244 may determine a reason/cause for the button malfunctioning, and perform the remedial action based on the determination of the reason/cause (including outputting a notification to the vehicle user indicating the cause of the malfunctioning). To determine a potential reason for the button malfunctioning, in some aspects, the processor 244 may obtain vehicle usage behavior from the detection unit 248 (and/or the server 204/memory 246), and determine that the button 240 may be malfunctioning and its reason based on the vehicle usage behavior. The processor 244 may then accordingly identify and perform a remedial action. For example, the processor 244 may determine that the vehicle 202 frequently travels to beaches based on the vehicle usage behavior, and thus a potential reason for the button malfunctioning may be accumulated sand/dust in the button 240. In this case, the processor 244 may output a notification 402 to the vehicle user via the infotainment system 238 to clean the button 240, as shown in FIG. 4. As another example, the processor 244 may determine that the vehicle user regularly eats/drinks inside the vehicle 202 based on vehicle usage behavior, and thus a potential reason for the button malfunctioning may be accumulated debris in the button 240. In this case also, the processor 244 may output a notification requesting the vehicle user to clean the debris off the button 240. In some aspects, the processor 244 may recommend the vehicle user to perform intermittent button cleaning based on the vehicle usage behavior, to prevent button malfunctioning in the future. As yet another example, suntan oil on user's finger may affect the performance of capacitive buttons if it accumulates on the button surface. In this case also, the processor 244 may output a notification requesting the vehicle user to clean the button 240.

In further aspects, the processor 244 may obtain environmental conditions (temperature/humidity) associated with the button 240 and/or the vehicle interior portion from the detection unit 248, and determine that the button 240 may be malfunctioning based on the environmental conditions. The processor 244 may further identify and perform a remedial action based on the environmental conditions. For example, the processor 244 may determine if the button 240 only gets stuck or malfunctions when the temperature may be lower than −20 Fahrenheit (cold soak overnight) or greater than 160 Fahrenheit (from parked vehicle soaking in the sun), or due to rapidly changing environment. Based on such determination, the processor 244 may assign the button functionality to the infotainment system 238, whenever the temperature drops below-20F or exceeds above 160 Fahrenheit. In some aspects, based on the button functionality and the expected frequency of usage in certain environments, the processor 244 may choose to not alert the vehicle user about the assigning of the button functionality to the infotainment system 238 (or to any other vehicle component/button) if usage is not expected. In further aspects, the processor 244 may output a notification to the vehicle user (via the infotainment system 238), requesting the vehicle user to change the vehicle interior temperature.

In additional aspects, the processor 244 may obtain information associated with the user's facial expressions and/or user inputs obtained from the detection unit 248, and determine that the button 240 may be malfunctioning based on the user's facial expressions/inputs. The processor 244 may further perform the remedial action based on the user's facial expressions/inputs. For example, the processor 244 may determine that the vehicle user may be frustrated while using/pressing the button 240, based on the information associated the user's facial expressions obtained from the detection unit 248. Based on such determination, the processor 244 may determine that the button 240 may be malfunctioning, and may then perform one or more remedial actions described above. For example, in this case, the processor 244 may quickly output a notification via the infotainment system 238 and/or the vehicle's interior speakers stating that the button functionality is assigned to the infotainment system 238, and request the vehicle user to use the infotainment system 238 instead of using the button 240 (to reduce user's frustration). In some aspects, the processor 244 may output a notification on the infotainment system

238 to confirm if the vehicle user is facing issues in using the button 240, when the processor 244 determines that the button 240 may be malfunctioning based on the user's facial expressions. Responsive to receiving the confirmation from the vehicle user, the processor 244 may perform one or more remedial actions described above.

In further aspects, the processor 244 may obtain feedback from the vehicle user (or other users) via the infotainment system 238, and determine that the button 240 may be malfunctioning. Based on such determination, the processor 244 may take the remedial action.

In further aspects, when the button 240 is not functioning, the processor 244 may output a notification to the vehicle user to keep using the button 240 and the processor 244 may monitor the button press via the vehicle camera to detect the user's wish to activate/deactivate the function.

Figure 5:
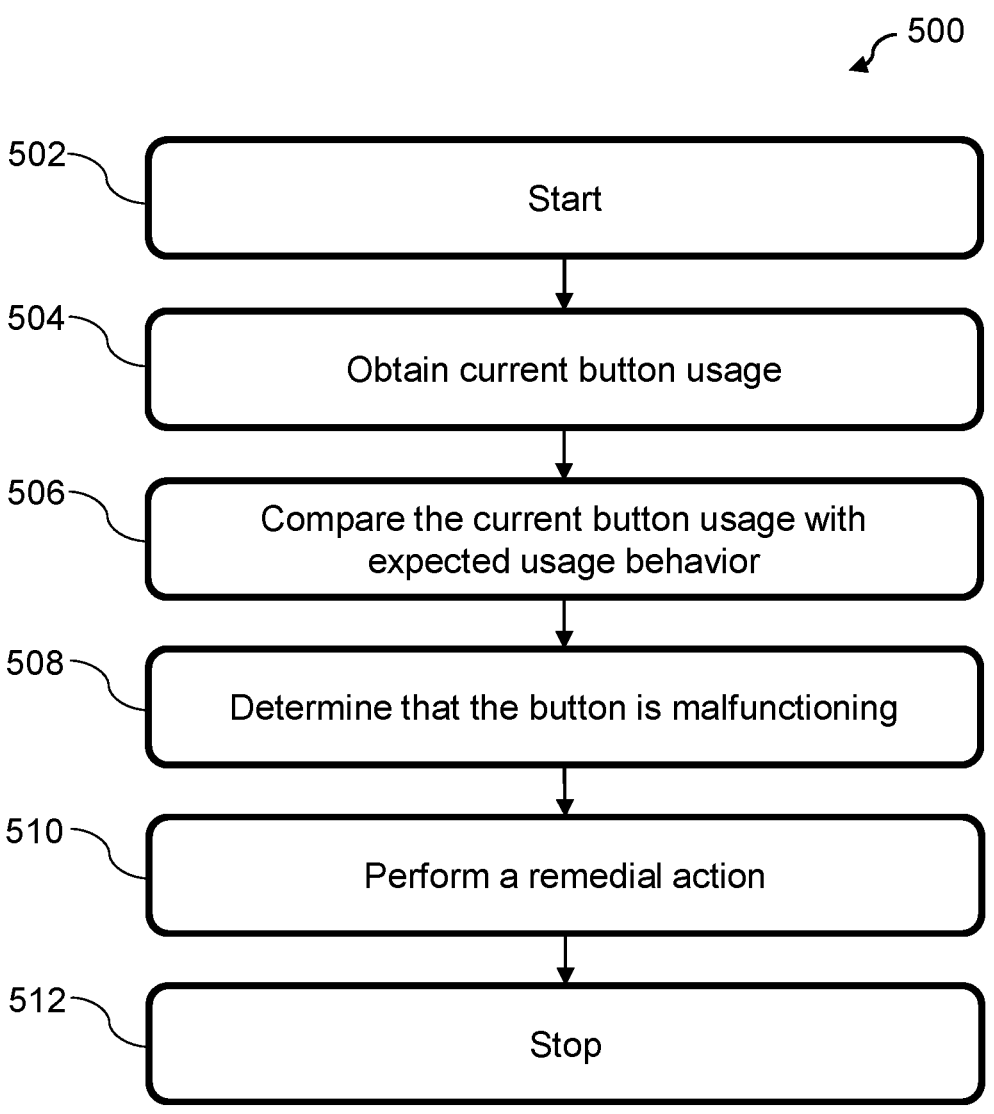
FIG. 5 depicts a flow diagram of a method for detecting a vehicle button malfunction and performing remedial action in accordance with the present disclosure.

FIG. 5 depicts a flow diagram of a method 500 for detecting a vehicle button malfunction and performing remedial action in accordance with the present disclosure. FIG. 5 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 500 starts at step 502. At step 504, the method 500 may include obtaining, by the processor 244, a current button usage of the button 240 from the detection unit 248. At step 506, the method 500 may include comparing, by the processor 244, the current button usage with the expected button usage behavior of the button 240.

At step 508, the method 500 may include determining, by the processor 244, that the button 240 may be malfunctioning based on the comparison. Specifically, the processor 244 may determine that the button 240 may be malfunctioning when a difference between the current button usage and the expected button usage behavior exceeds a predefined threshold. At step 510, the method 500 may include performing, by the processor 244, a remedial action responsive to determining that the button may be malfunctioning.

The method 500 may end at step 512.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
a detection unit configured to monitor a current button usage associated with a button of the vehicle and to monitor one or more environmental conditions in proximity of the button, the one or more environmental conditions related to temperature or humidity; and
a processor communicatively coupled to the detection unit, wherein the processor is configured to:
obtain the current button usage;
compare the current button usage with an expected button usage behavior associated with the button;
determine that a difference between the current button usage and the expected button usage behavior exceeds a predefined threshold;
determine, based on the one or more environmental conditions and the determination that the difference between the current button usage and the expected button usage behavior exceeds the predefined threshold, that the button is malfunctioning; and
perform a remedial action responsive to determining that the button is malfunctioning.

2. The vehicle of claim 1, wherein the current button usage comprises a hold time associated with the button.

3. The vehicle of claim 1, wherein the current button usage comprises a frequency of usage of the button in a predefined time duration.

4. The vehicle of claim 1, wherein the detection unit is configured to monitor temperature and humidity associated with the button.

5. The vehicle of claim 4, wherein the processor is further configured to:
perform the remedial action based on the one or more environmental conditions.

6. The vehicle of claim 1, wherein the detection unit is configured to monitor a vehicle usage behavior, and wherein the vehicle usage behavior comprises at least one of: eating or drinking habits inside the vehicle, a vehicle movement pattern to specific locations, or use of gloves inside the vehicle.

7. The vehicle of claim 6, wherein the processor is further configured to:
determine that the button is malfunctioning based on the vehicle usage behavior; and
perform the remedial action based on the determination the button is malfunctioning.

8. The vehicle of claim 1, wherein the detection unit is further configured to monitor user facial expressions.

9. The vehicle of claim 8, wherein the processor is further configured to:
determine that the button is malfunctioning based on the user facial expressions; and
perform the remedial action based on the determination the button is malfunctioning.

10. The vehicle of claim 1, further comprising a memory configured to store information associated with historical button usage for the button, wherein the processor is further configured to:
obtain the information associated with the historical button usage from the memory; and
determine the expected button usage behavior based on the information associated with the historical button usage.

11. The vehicle of claim 1, wherein the processor is further configured to:
identify a malfunction type based on the comparison of the current button usage with the expected button usage behavior, wherein the malfunction type comprises a stuck button, a non-operational button, or an intermittently working button; and
perform the remedial action based on the malfunction type.

12. The vehicle of claim 1, wherein the remedial action comprises outputting a notification to a vehicle Human-Machine Interface (HMI) requesting a vehicle user to clean the button or repair the button.

13. The vehicle of claim 1, wherein the remedial action comprises outputting a notification to a vehicle HMI requesting a vehicle user to change a vehicle interior temperature.

14. The vehicle of claim 1, wherein the remedial action comprises assigning another vehicle component a functionality associated with the button, wherein the other vehicle component comprises another vehicle button or a vehicle HMI.

15. The vehicle of claim 1, wherein the remedial action comprises disabling a functionality associated with the button.

16. A method comprising:

obtaining, by a processor, a current button usage associated with a button of a vehicle from a detection unit;

comparing, by the processor, the current button usage with an expected button usage behavior associated with the button;

determining, by the processor, that a difference between the current button usage and the expected button usage behavior exceeds a predefined threshold;

obtaining, by the processor, one or more environmental conditions associated with the button, the one or more environmental conditions related to temperature or humidity;

determining, by the processor and based on the one or more environmental conditions and the determination that the difference between the current button usage and the expected button usage behavior exceeds the predefined threshold, that the button is malfunctioning; and performing, by the processor, a remedial action responsive to determining that the button is malfunctioning.

17. The method of claim 16, wherein the current button usage comprises a hold time associated with the button.

18. The method of claim 16, wherein the current button usage comprises a frequency of usage of the button in a predefined time duration.

19. The method of claim 16 further comprising:

identifying a malfunction type based on the comparison of the current button usage with the expected button usage behavior, wherein the malfunction type comprises a stuck button, a non-operational button, or an intermittently working button; and performing the remedial action based on the malfunction type.

20. A non-transitory computer-readable storage medium having instructions stored thereupon which, when executed by a processor, cause the processor to:

obtain a current button usage associated with a button of a vehicle from a detection unit;

compare the current button usage with an expected button usage behavior associated with the button;

determine that a difference between the current button usage and the expected button usage behavior exceeds a predefined threshold;

obtain one or more environmental conditions associated with the button, the one or more environmental conditions related to temperature or humidity;

determine, based on the one or more environmental conditions and the determination that the difference between the current button usage and the expected button usage behavior exceeds the predefined threshold, that the button is malfunctioning; and perform a remedial action responsive to determining that the button is malfunctioning.

* * * * *